(12) United States Patent
Bleier

(10) Patent No.: US 6,945,661 B2
(45) Date of Patent: Sep. 20, 2005

(54) ROOF MIRROR ASSEMBLY

(75) Inventor: Zvi Bleier, Centerport, NY (US)

(73) Assignee: PLX, Inc., Deer Park, NY (US)

( * ) Notice: Subject to any disclaimer, the term of this patent is extended or adjusted under 35 U.S.C. 154(b) by 0 days.

(21) Appl. No.: 10/822,916

(22) Filed: Apr. 13, 2004

(65) Prior Publication Data

US 2004/0196576 A1 Oct. 7, 2004

Related U.S. Application Data

(62) Division of application No. 09/894,207, filed on Jun. 28, 2001, now Pat. No. 6,729,735.

(51) Int. Cl.[7] ............................. G02B 5/08; G02B 7/182
(52) U.S. Cl. ....................................... 359/856; 359/857
(58) Field of Search ................................ 359/834, 836, 359/850, 855, 856, 857

(56) References Cited

U.S. PATENT DOCUMENTS

| 621,283 | A | | 3/1899 | Pulfrich | |
| --- | --- | --- | --- | --- | --- |
| 633,481 | A | * | 9/1899 | Paschall | 40/1 |
| 784,487 | A | | 3/1905 | Goerz et al. | |
| 813,136 | A | * | 2/1906 | Balch | 359/856 |
| 1,334,810 | A | * | 3/1920 | Smith, Jr. | 359/855 |
| 1,635,011 | A | | 7/1927 | Sadler | |
| 2,036,184 | A | * | 4/1936 | Armstrong | 108/101 |
| 2,167,657 | A | | 8/1939 | Karnes | |
| 3,252,377 | A | * | 5/1966 | Kentes | 359/855 |
| 3,606,535 | A | * | 9/1971 | Koizumi | 355/66 |
| 3,966,298 | A | | 6/1976 | Chapman | |
| 3,977,765 | A | | 8/1976 | Lipkins | |
| 4,065,204 | A | | 12/1977 | Lipkins | |
| 4,401,384 | A | * | 8/1983 | Abe | 399/118 |
| 4,704,000 | A | | 11/1987 | Pekar et al. | |
| 5,024,514 | A | | 6/1991 | Bleier et al. | |
| 5,122,901 | A | | 6/1992 | Bleier | |
| 5,134,519 | A | | 7/1992 | Abele et al. | |
| 5,301,067 | A | | 4/1994 | Bleier et al. | |
| 5,335,111 | A | | 8/1994 | Bleier | |
| 5,361,171 | A | | 11/1994 | Bleier | |
| 5,589,991 | A | * | 12/1996 | Bleier | 359/856 |
| 5,949,543 | A | * | 9/1999 | Bleier et al. | 356/451 |
| 6,290,363 | B1 | * | 9/2001 | Masutani | 359/856 |
| 6,729,735 | B2 | * | 5/2004 | Bleier | 359/856 |
| 6,752,503 | B2 | * | 6/2004 | Bleier | 359/871 |
| 6,786,608 | B1 | * | 9/2004 | Bleier | 359/515 |

* cited by examiner

Primary Examiner—Ricky D. Shafer
(74) Attorney, Agent, or Firm—Kaplan & Gilman, LLP; Michael R. Gilman, Esq.

(57) ABSTRACT

An improved roof mirror assembly is provided. The roof mirror assembly of the invention is comprised of first and second mirror panels having first and second reflective surfaces and first and second back portions, respectively, the first and second mirror panels being joined together so that the first and second reflective surfaces are substantially perpendicular to each other, and at least one mounting block to complete the joining together of the first and second mirror panels into the roof mirror assembly and for mounting the assembly onto another structure, the at least one mounting block attached to both the first and second back portions of the mirror panels, wherein the back portions extend along the respective mirror panels in orientations that do not meet or intersect with the reflective surfaces.

9 Claims, 13 Drawing Sheets

ROOF MIRROR ASSEMBLY

This application is a divisional of application Ser. No. 09/894,207, filed Jun. 28, 2001, issued May 4, 2004 as U.S. Pat. No. 6,729,735, which application is hereby incorporated by reference herein in its entirety.

BACKGROUND OF THE INVENTION

This invention relates to the field of retroreflectors, and more particularly, to lateral transfer retroreflectors.

Retroreflectors generally have the property of causing incident and reflected light rays to travel along parallel paths. To achieve this parallelism, a retroreflector normally consists of three optically flat reflecting surfaces, each reflecting surface positioned at a right angle to each of the other reflecting surfaces. Any departure of the reflecting surfaces from their perpendicular orientation will cause the incident and reflected light rays to depart from parallel.

Retroreflectors lose accuracy when they are exposed to external stresses. Examples of such external stresses are mass, thermal expansion or contraction of the substrate material from which the retroreflector is made, or deflection caused by curing of the adhesives which join members of the retroreflector.

Retroreflectors, and lateral transfer retroreflectors (which translate the reflected beam some calculated distance from the incident light beam), are old in the art. Examples of prior art retroreflectors and lateral transfer retroreflectors are:

U.S. Pat. No. 3,977,765 to Morton S. Lipkins, which disclosed a retroreflector mounted to a support structure through means of applying an adhesive into the joints formed between joined members of the retroreflector and to a flat surface of the support structure.

U.S. Pat. No. 4,065,204, also to Morton S. Lipkins, which disclosed a lateral transfer retroreflector consisting of a base, a roof reflector having two reflecting plates and a third reflector. The base acts as an extension of the third reflector by attaching the third reflector to the roof reflector in the manner known to retroreflectors to produce the lateral transfer retroreflector construction.

U.S. Pat. No. 5,024,514 to Zvi Bleier and Morton S. Lipkins, which discloses a lateral transfer retroreflector having a tubular member, a roof mirror and a mirror panel. Both the roof mirror and mirror panel are attached to the tubular member by use of three co-planar mounting pads.

U.S. Pat. No. 5,361,171, also to Zvi Bleier, which discloses a lateral transfer retroreflector having a fixed-length tubular member, a roof mirror secured within a channel portion extending from an end of the tubular member and a mirror panel attached to the tubular member at the opposite end from the roof mirror and roof mirror panel.

It would be desirable to provide a high-accuracy lateral transfer retroreflector that is off-the-shelf adjustable as to the displaced length between the mirror panel and the roof mirror and also having a less temperature-deviant assembly and mounting of the roof mirror and mirror panel.

SUMMARY OF THE INVENTION

In accordance with the invention, an improved lateral transfer retroreflector assembly is provided. The lateral transfer retroreflector assembly of the invention is comprised of three separate, attached segments. A first segment comprising a mirror panel housing, a second segment comprising a roof mirror housing, and a third segment comprising a connecting member between the two housings.

The mirror panel housing will have mounted thereto a mirror panel. The roof mirror housing will have mounted thereto a roof mirror assembly, and the connecting member will be mounted between the mirror panel housing and the roof mirror housing. In addition, based upon the mounting together of the three separate segments, the connecting member will have the ability of being an off-the-shelf member that is selectively able to be cut to a particular length dimension based upon customer specifications, thereby allowing for customized creation of lateral transfer retroreflectors, but at a time and cost savings to the customer.

In addition, the roof mirror assembly and the mirror panel mounting are kinematic structures that are also improvements over earlier constructions. In particular, the roof mirror assembly of the subject invention preferably has at least a pair of mounting members that act also as back supports and are located substantially at opposite ends of the roof mirror. However, the invention anticipates the roof mirror assembly having at least one mounting member. The manner of attachment of the mounting members to the back portions of the mirror panels making up the roof mirror assembly, is such that expansion and contraction of the reflective surfaces of the mirror panels of the roof mirror assembly will preferably only be in a direction substantially perpendicular to the direction of the roof angle axis. Deflection in this direction does not cause displacement (error) of the transmitted light beam traveling through the lateral transfer retroreflector, and therefore such a mounting system is advantageous. Similarly, the mounting of the mirror panel to the mirror panel housing by means of substantially 45° chamfered edges, insures that the forces exerted by thermal expansion or contraction of the bonding material situated along those chamfered edges, will have a canceling effect, and not deflect the reflective surface of the mirror panel.

Accordingly, it is an object of the present invention to provide an improved lateral transfer retroreflector assembly.

Still another object of the invention is to provide a lateral transfer retroreflector assembly having a component construction capable of, allowing for off-the-shelf customization for different customer needs based upon differing customer specifications.

Yet a further object of the invention is to provide a lateral transfer retroreflector assembly having a roof mirror assembly construction and mounting such that deformations in the reflective surfaces of the mirror panels of the roof mirror assembly due to thermal expansion/contraction are minimized in the direction of the roof angle axis.

A still further object of the invention is to provide a lateral transfer retroreflector assembly, wherein the deflective forces exerted on the mirror panel by thermal expansion or contraction of the joint bonding the mirror panel to the mirror panel housing, are minimized.

Other objects of the invention will in part be obvious and will in part be apparent from the following description taken in association with the figures.

The invention accordingly comprises an assembly possessing the features, properties and relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
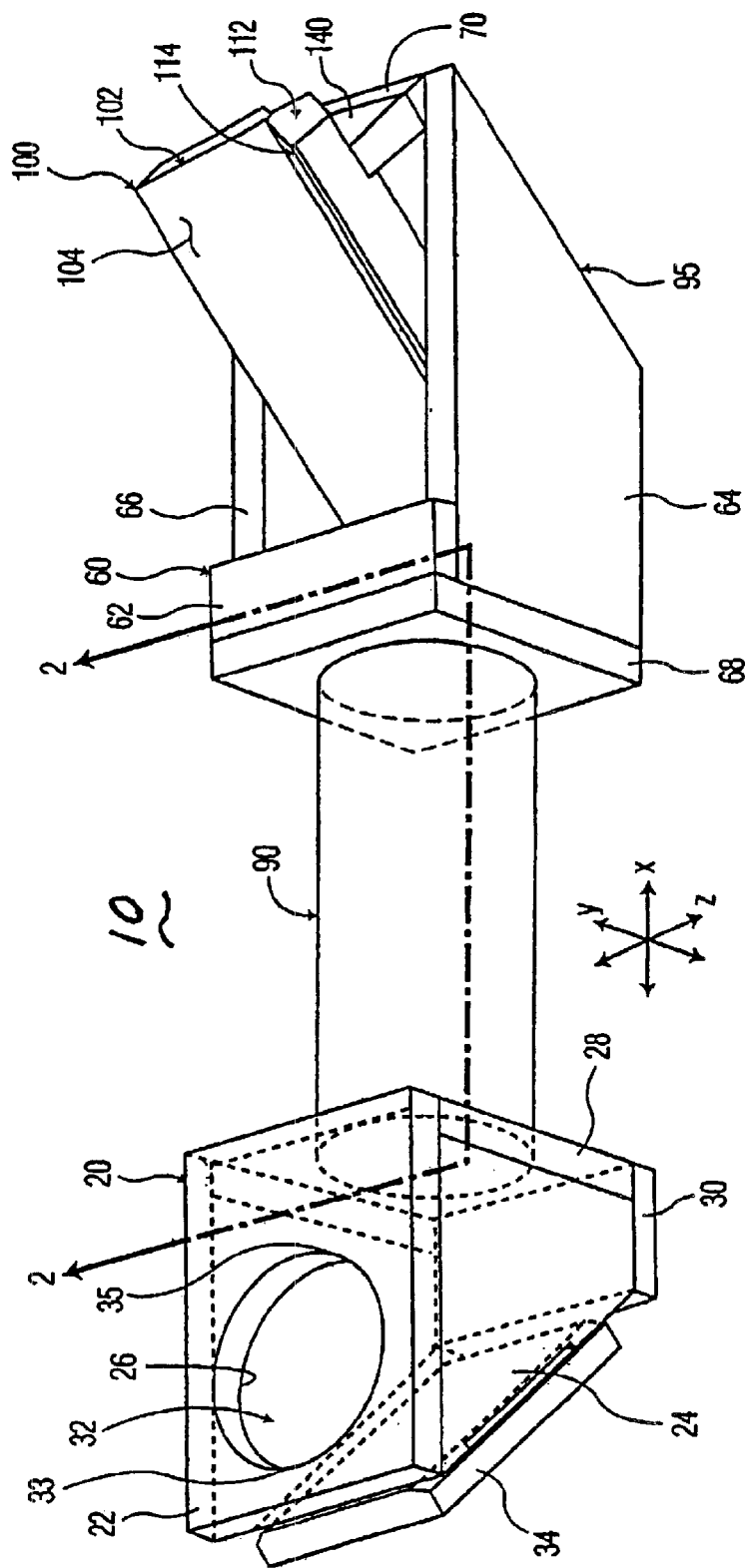
FIG. 1 is a perspective view of a lateral transfer retroreflector assembly made in accordance with the invention.

Referring to FIG. 1, a lateral transfer retroreflector assembly made in accordance with the invention and generally designated at 10, is illustrated. Lateral Transfer Retroreflector ("LTR") 10 comprises three components; those being a mirror panel housing 20, a roof mirror assembly housing 60 and a connecting member 90, having a thickness 92.

Figure 4:
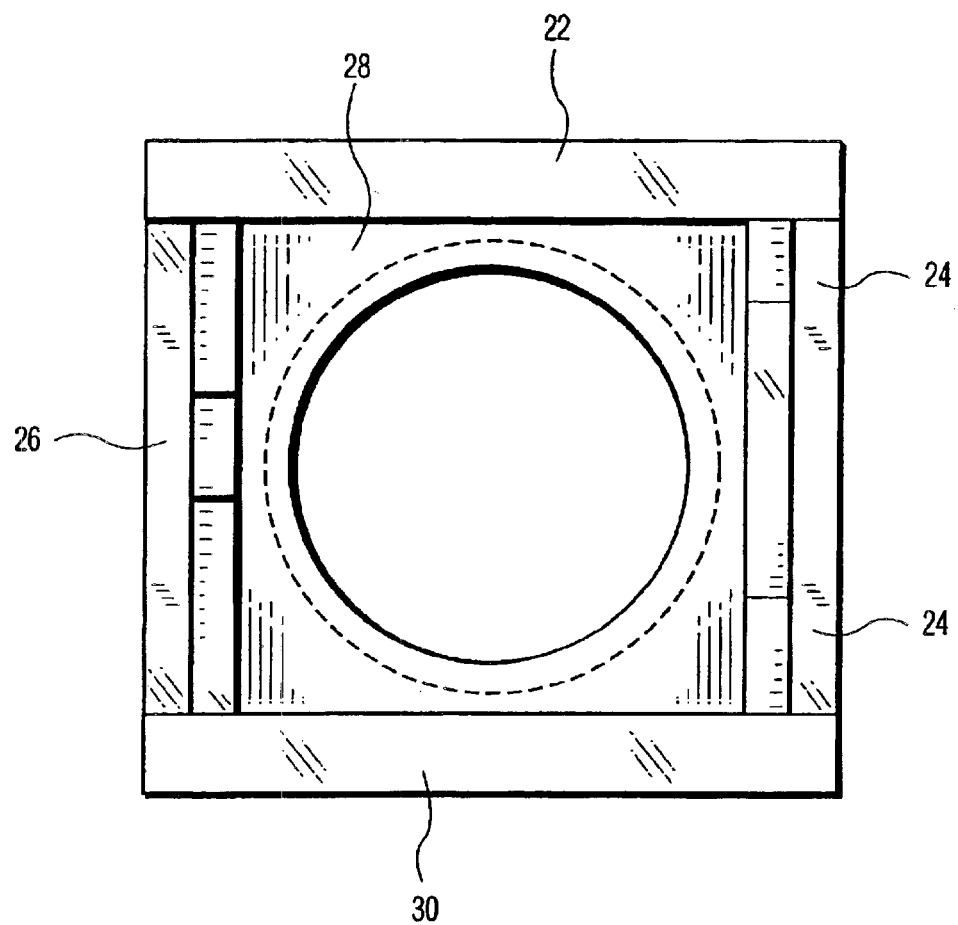
FIG. 4 is a left side elevational view of the mirror panel housing of the invention.

As seen in FIGS. 1 and 4, mirror panel housing 20 is comprised of first and second side members 24 and 26, as well as receiving member 28, for receiving connecting member 90. Housing 20 can also include member 30, to lend extra stability to the structure, as well as aperture receiving member 22, having aperture 32 extending therethrough. Aperture 32 can be of any geometric configuration, the preferred configurations being in the circle and square families. Aperture 32 has a first end 33 and a second end 35, the distance between which will help dictate the inside diameter of connecting member 90. It is to be understood herein that member 90 does not have to be circular in cross section, but could be of other shapes; particularly square. However, since light beams to be passed through LTR 10 are normally themselves circular in cross section, the preferred embodiment shown in the figures and discussed herein, will regard a circular aperture 32 and a circular tubular member 90.

Continuing with the above discussion, the dimensional congruity between the size of aperture 32 and the cross sectional diameter of member 90 will insure that a light beam passing through LTR 10 will propagate through member 90 very close to the inside surface of member 90 as the beam approaches either of ends 33 or 35 of aperture 32.

Figure 2:
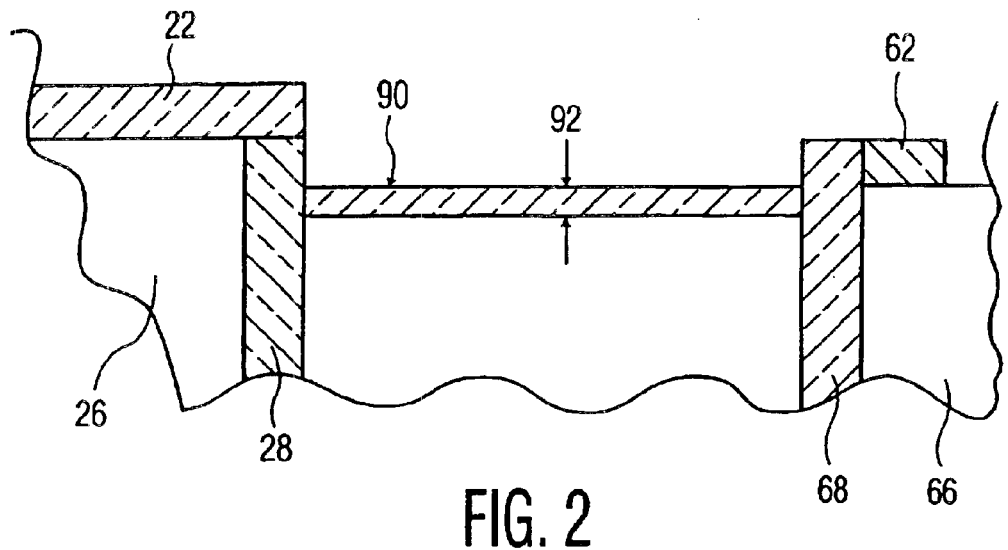
FIG. 2 is a cross-sectional view taken along line 2—2 of FIG. 1.

It is also seen in FIGS. 1 and 2 that roof mirror assembly housing 60 is comprised of side members 64 and 66, receiving member 68, as well as a top member 62. Receiving members 28 of mirror panel housing 20 and 68 of roof mirror assembly housing 60, receive connecting member 90 to join housings 20 and 60 into a complete lateral transfer retroreflector assembly 10.

Figure 3:
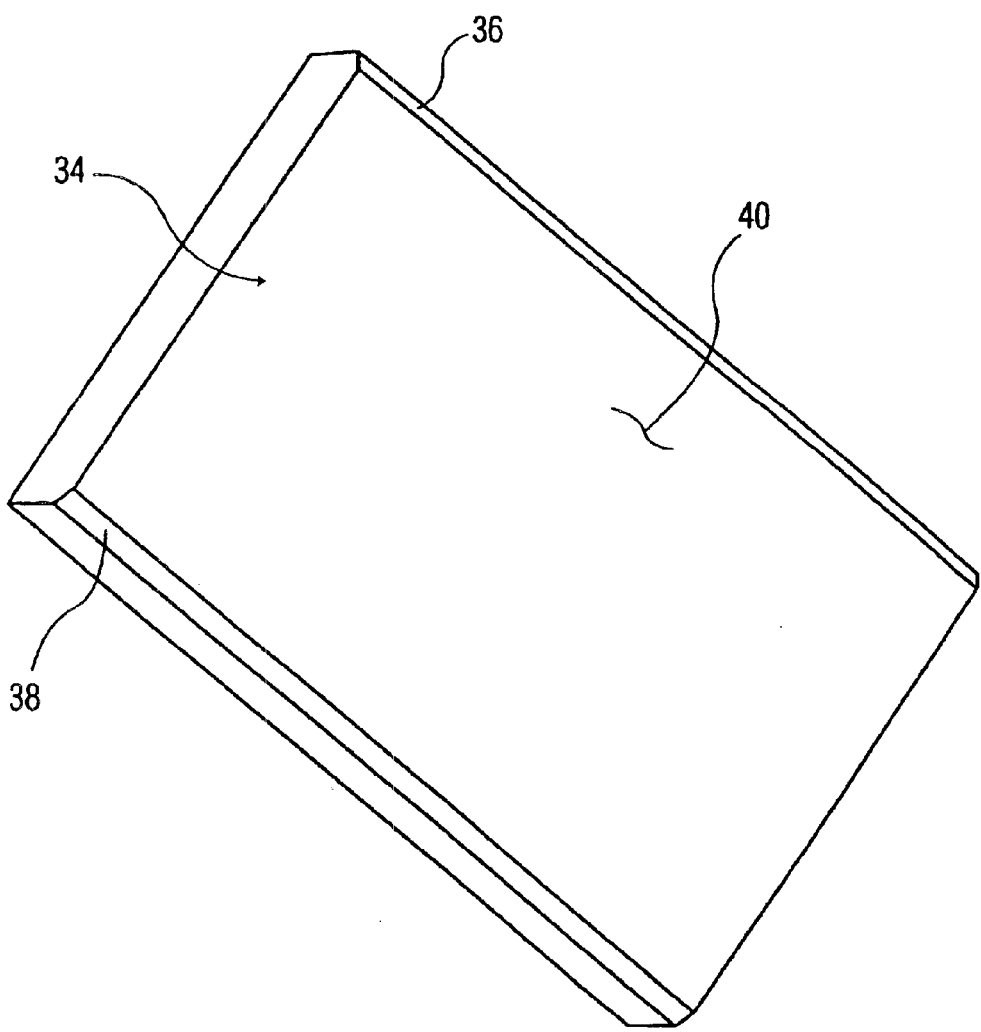
FIG. 3 is a perspective view of the mirror panel of the invention.

Turning now to FIG. 3, mirror panel 34 to be used with LTR 10 is shown. Mirror panel 34 has a reflective surface 40, and two chamfered edges 36 and 38. As seen in FIG. 1, mirror panel 34 is adhered to mirror panel housing 20 in such a manner as to be oriented with its reflective surface 40 below, and in reflective relation with, aperture 32 and member 90. In practice, and as will be discussed in more detail below, the light beam, if it is entering LTR 10 through aperture 32, will then reflect off of reflective surface 40 of mirror panel 34, and propagate through member 90 into roof mirror assembly housing 60, where it will reflect off of reflective surfaces 104 and 114 of roof mirror assembly 100 to propagate back toward the source of the beam, in a direction substantially parallel to the beam's incident direction, but at a displaced distance, substantially based upon the length of member 90.

Figure 4A:
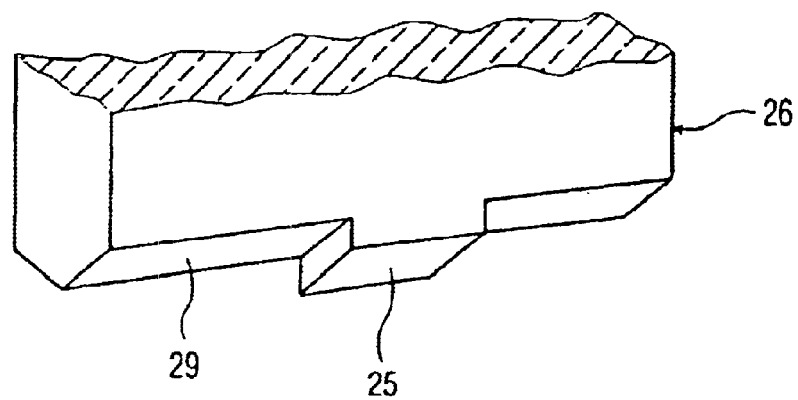
FIG. 4A is a partial prespective view of the mounting pad of member 26 of the mirror panel housing.
Figure 4B:
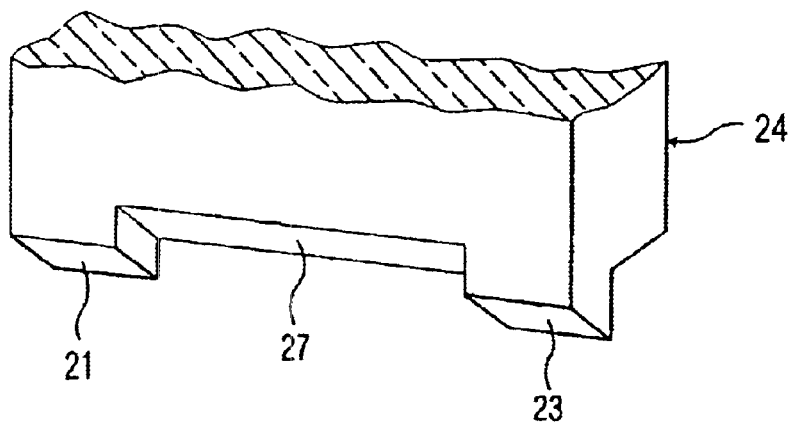
FIG. 4B is a partial perspective view of the mounting pad of member 24 of the mirror panel housing.
Figure 5:
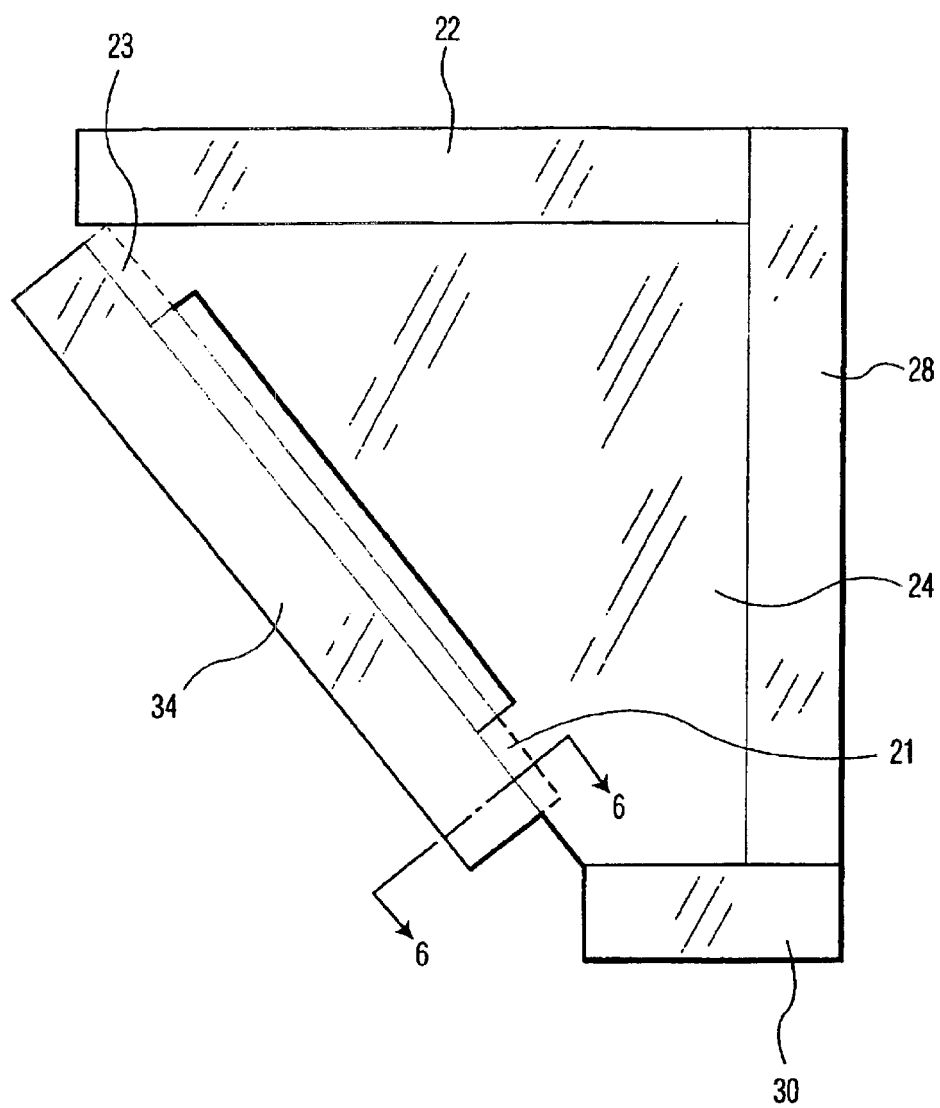
FIG. 5 is a right side elevational view of the mirror panel housing.
Figure 6:
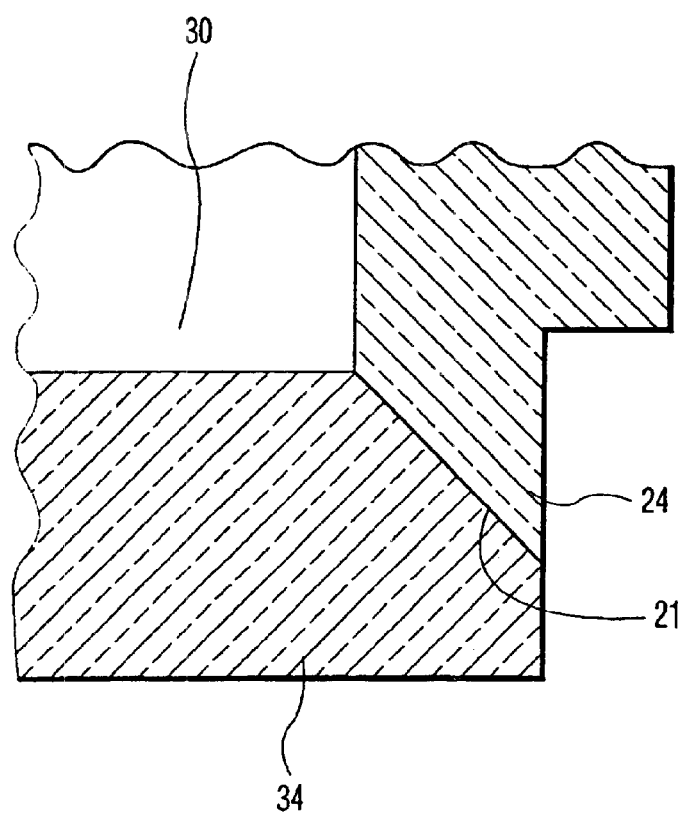
FIG. 6 is a cross-sectional view taken along line 6—6 of FIG. 5.
Figure 7:
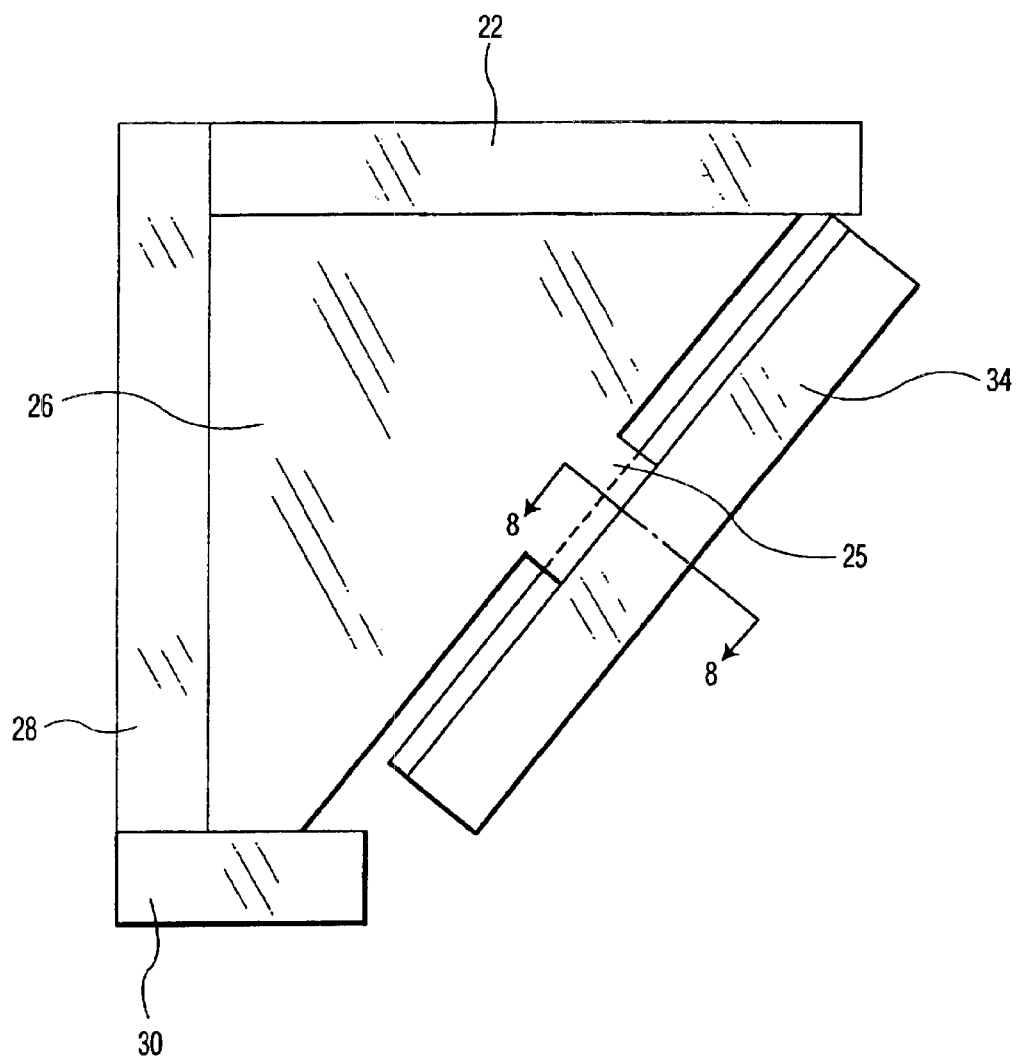
FIG. 7 is a left side elevational view of the mirror panel housing.
Figure 8:
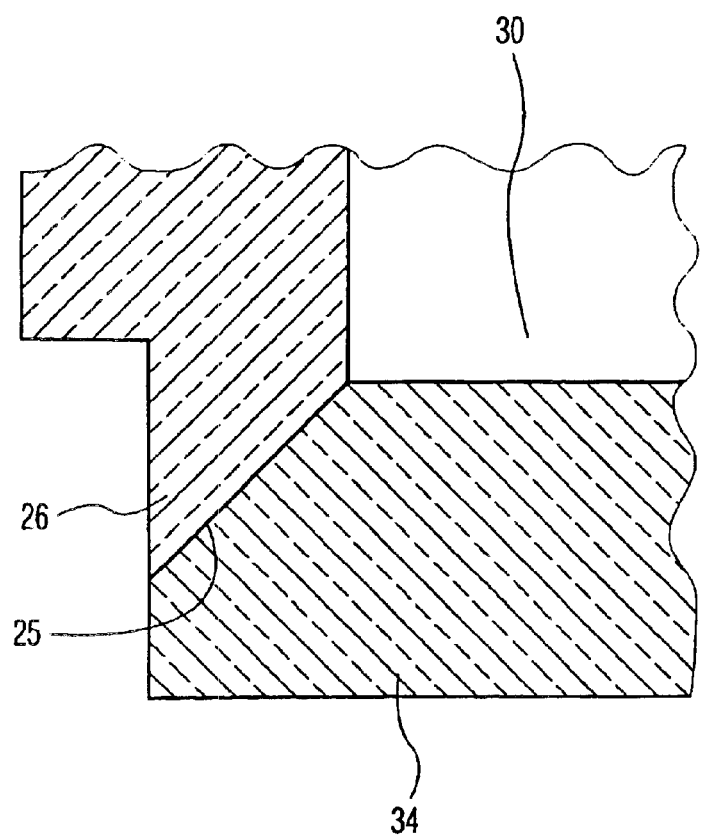
FIG. 8 is a cross-sectional view taken along line 8—8 of FIG. 7.

Continuing with FIGS. 3–8, it is seen that mirror panel 34 is adhered at three contact surfaces to corresponding mounting pads 21, 23, and 25 of edge portions 27 and 29 of first and second side members 24 and 26, respectively. In particular, edge portions of 27 and 29, and their corresponding mounting pads 21, 23 and 25, onto which mirror panel 34 is adhered, are themselves chamfered, as is best seen in FIGS. 4A and 4B. The construction and mounting of mirror panel 34 of the subject invention is different to that of the prior art in U.S. Pat. Nos. 5,024,514 and 5,361,171 (discussed earlier herein), in that the subject connection between mirror panel 34 and mirror panel housing 20 is chamfered surface to chamfered surface, as opposed to the prior art disclosure of mounting pads oriented perpendicularly to the reflective surface. What is similar, however, between the subject connection of mirror panel 34, and the prior art connections, is the adhesion of mirror panel 34 to mirror panel housing 20 at only three distinct areas; two areas along chamfered surface 38 and only one area along chamfered surface 36. The use of the matching chamfered surfaces 36/38 and 21/23 and 25 helps to reduce the distortional effect of the connection of mirror panel 34 to mirror panel housing 20, as well as to help reduce stresses caused by thermal expansion/contraction, as the substantially 45° of the chamfers insures that such distortional forces do not distort rereflective surface 40 in a way to effect the orientation of the beam passing through LTR 10.

Specifically, LTR 10 of the present invention is a highly accurate instrument which can be used in such precise fields as surveying, military and aerospace applications, to name a few. It is usually necessary that instruments used in these areas meet very specific stress and dimensional specifications, and therefore the manner of construction of LTR 10 with respect to joining parts thereof together, and the length and depth dimensions of LTR 10, are important. Accordingly, as will be discussed in more detail below, although lateral transfer retroreflectors are old in the art, the particular manners in which mirror panel 34 and roof mirror assembly 100 are made and mounted to their respective housings, will impact the durability and dimensional integrity of LTR 10.

Turning now to a discussion of roof mirror assembly 100, this assembly is best seen in FIGS. 9–12. Roof mirror assembly 100 comprises a pair of mirror panels 102 and 112, and a pair of mounting blocks 140 and 160.

Figure 9:
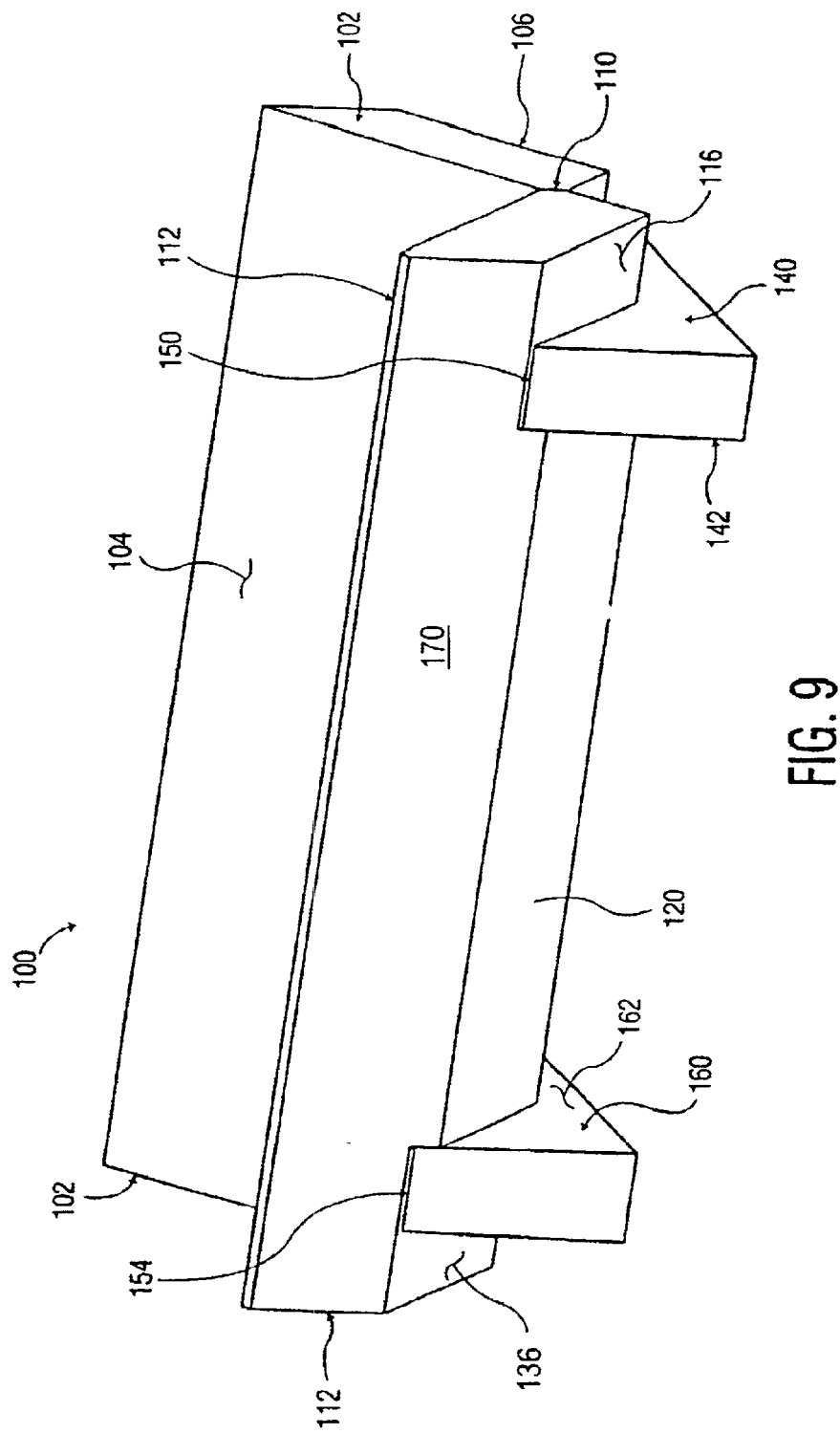
FIG. 9 is a perspective view of the roof mirror assembly of the subject invention.
Figure 10:
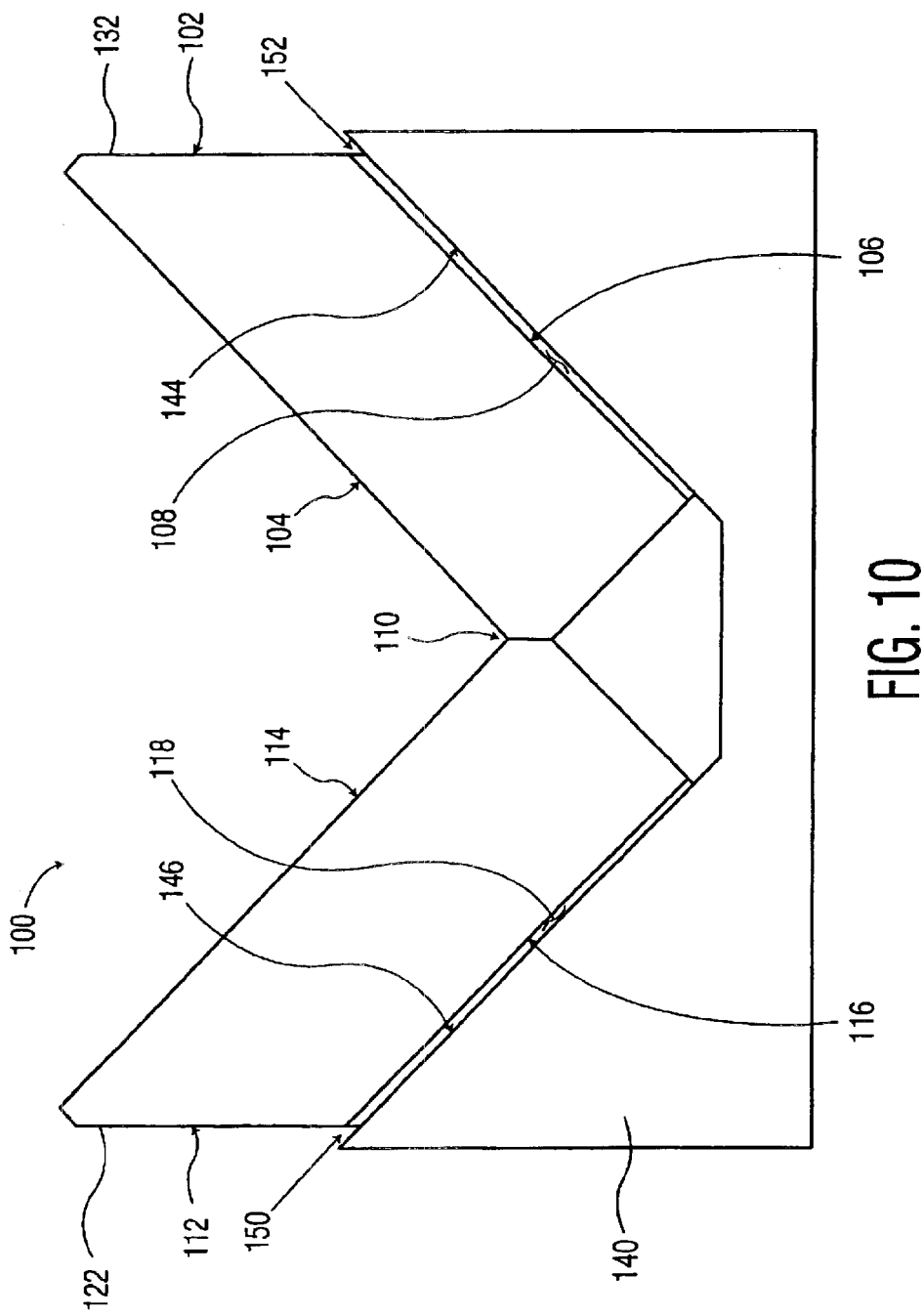
FIG. 10 is an elevational view of one end of the roof mirror assembly of FIG. 9.
Figure 11:
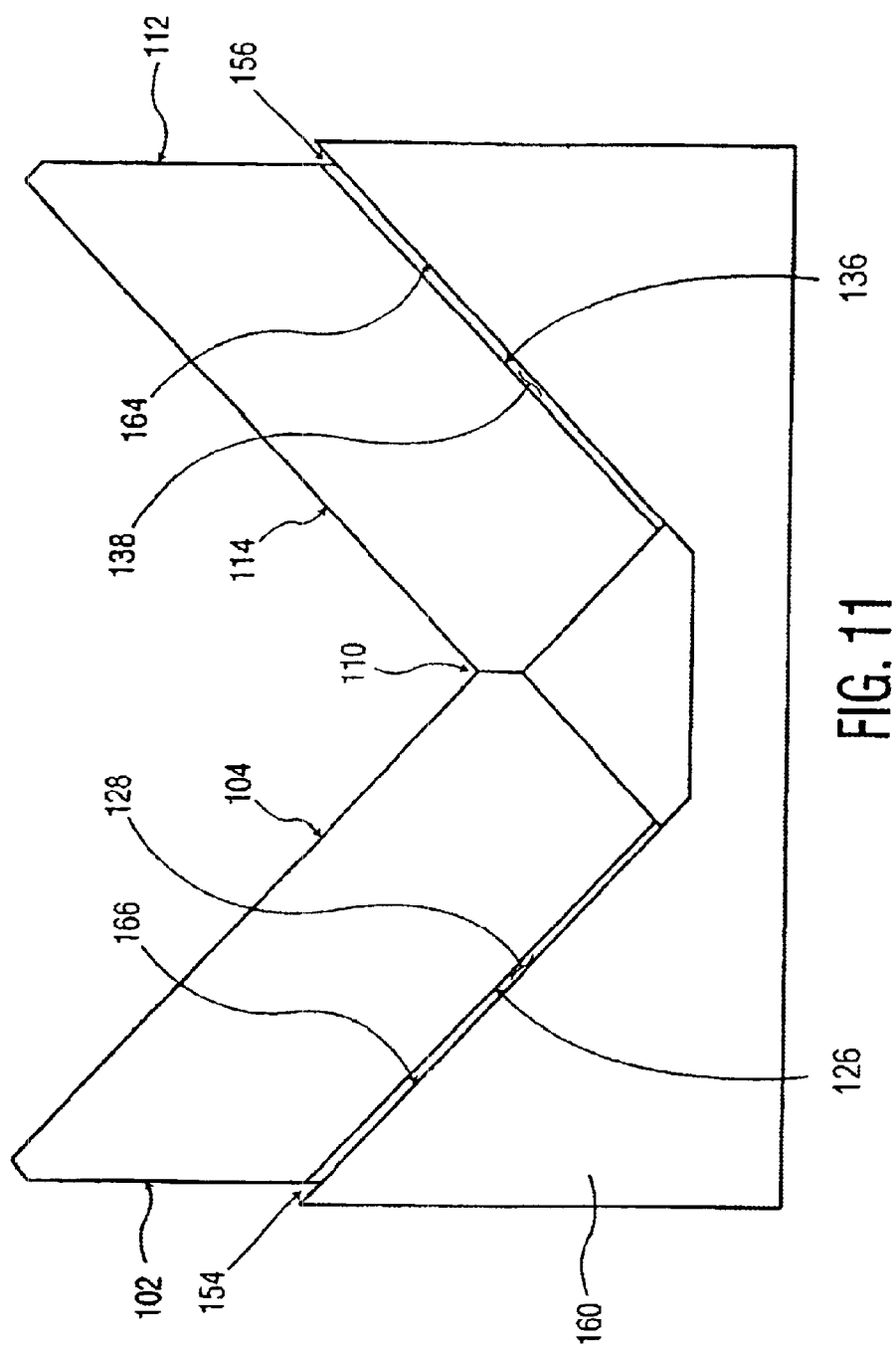
FIG. 11 is an elevational view of the other end of the roof mirror assembly of FIG. 9.
Figure 12:
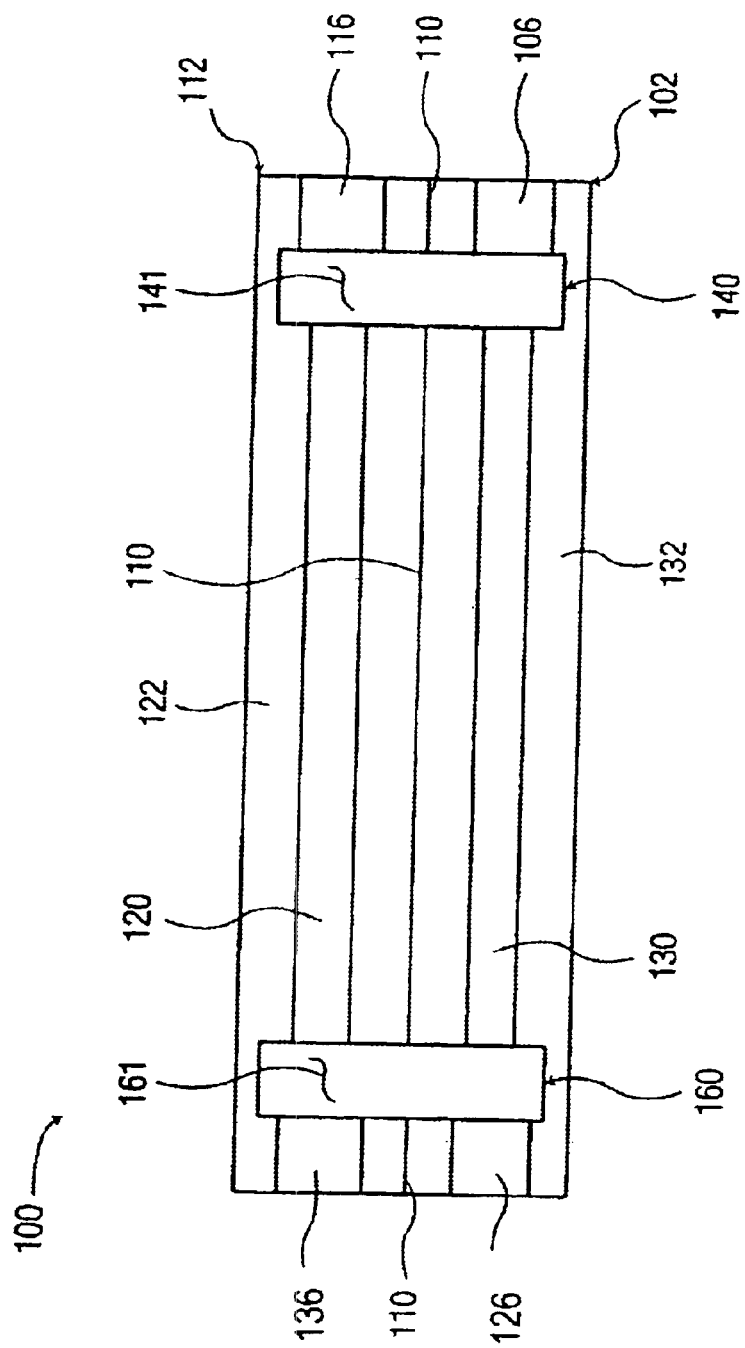
FIG. 12 is a bottom plan view of the roof mirror assembly of FIG. 9.

Mirror panels 102 and 112 have reflective surfaces 104 and 114, respectively, which reflective surfaces are in reflective relation with reflective surface 40 of mirror panel 34, as well as member 90 and aperture 32, and back, non-reflective surfaces 130, 132 and 120, 122, respectively. In particular, reflective surface 104 is substantially perpendicularly oriented to reflective surface 114, and reflective surface 40 is itself oriented substantially perpendicularly to both reflective surfaces 104 and 114. This mutually perpendicular orientation of the three reflective surfaces of LTR 10 essentially duplicates the construction of a standard Hollow™ retroreflector as is known in the art. Referring to FIGS. 9–11, mirror panels 102 and 112 are seen to be adhered together at joint 110. In a preferred embodiment, this joining together is achieved through a miter joint connection, although other manners of joining the two panels are anticipated herein (as is known in prior art roof mirror constructions), so long as reflective surfaces 104 and 114 are substantially perpendicular to each other. In order to create miter joint 110, the attachment surfaces of mirror panels 102 and 112 which are joined together to create miter joint 110, are at substantially 45 degree angles to reflective surfaces 104 and 114, so as to create the perpendicularity between the reflective surfaces upon creation of miter joint 110, and the associated reduction of distortive forces, as earlier discussed.

With reference to FIG. 9, mirror panel 112 can include protruding element 170 extending from the back portion of mirror panel 112 in a direction generally away from reflective surface 114, Protruding element 170 has multiple receiving surfaces onto which mounting blocks 140 and 160 can be attached. For example first and second receiving surfaces can be surfaces 118 and 138 of mirror panel 112 (see FIGS. 10 and 11) when planes perpendicular to reflective surface 114 are required, or can be along surface 190 when planes parallel to reflective surface 114 are required. Alternatively, a combination of either surface 118 or 138 and 120 can be used when perpendicular and parallel surfaces are required.

Continuing with a discussion of FIGS. 9–11, it is seen that connected together panels 102 and 112 are finally formed into a secure roof mirror assembly through the mounting of back surfaces of panels 102 and 112 to portions of surfaces 142 and 162 of mounting blocks 140 and 160. In a preferred embodiment, when panels 102 and 112 are mounted to blocks 140 and 160, air gaps 150, 152, 154 and 156 are created. Air gap 150 is between surface 146 of mounting block 140 and surface 116 of panel 112. Air gap 152 is between surface 144 of mounting block 140 and surface 106 of panel 102. Air gap 154 is between surface 166 of mounting block 160 and surface 126 of panel 102. Air gap 156 is between surface 164 of mounting block 160 and surface 136 of panel 112 (see FIGS. 10 and 11).

As is further seen in FIGS. 10 and 11, in a preferred embodiment, the back surfaces of panels 102 and 112 that are adhered to mounting blocks 140 and 160 as discussed above, are surfaces 108 and 128 for panel 102, and surfaces 118 and 138 for panel 112. In construction, surfaces 108/128 and 118/138 are all substantially perpendicular in orientation to miter joint 110. Such a construction helps to ensure that any substantial distortional effects due to thermal expansion/contraction of panels 102 and 112 and/or block 140 and 160 will be in a direction substantially perpendicular to a longitudal axis for roof mirror assembly 100; i.e., perpendicular to the planes of reflective surfaces 104 and 114.

Turning again to FIG. 1, it is seen that roof mirror assembly 100 is secured to roof mirror assembly housing 60 by way of connection between bottom surfaces 141 and 161 of blocks 140 and 160 to member 70 of housing 60. Such a secure connection of roof mirror assembly 100 to housing 60 assists and strengthens the durability of LTR 10.

Regarding connecting member 90, as has been stated, this member can be cut from an off-the-shelf member of standard construction and length. Such an off-the-shelf retro-fit of connecting member 90 allows one to stock separate quantities of housings 20 and 60, and member 90, for construction of an LTR 10 to meet any customer specifications, in a quick and cost affective manner.

Figure 13:
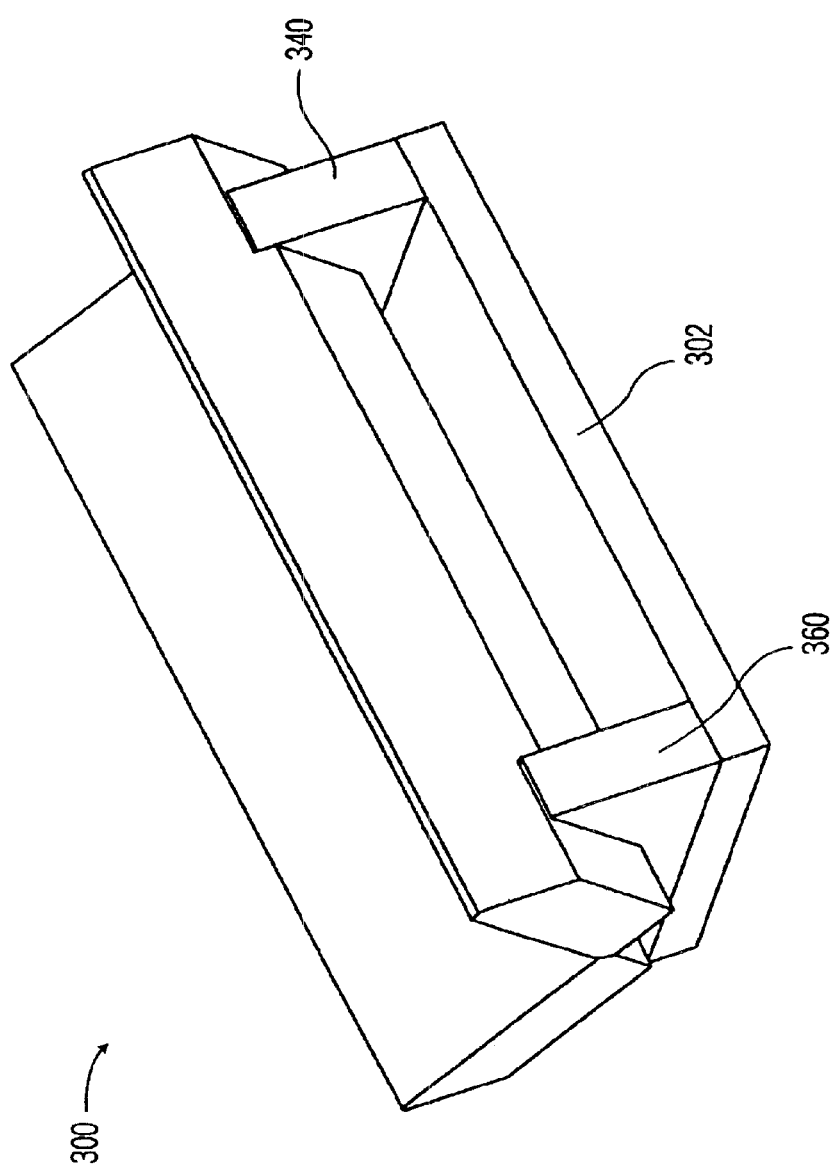
FIG. 13 is a perspective view of a second embodiment of the roof mirror assembly of the subject invention.

Turning now to a discussion of FIG. 13, a second embodiment of the inventive roof mirror assembly 100 is shown at 300. Assembly 300 is constructed identically to that of assembly 100, accept for the addition of back plate member 302, adhered below mounting blocks 340 and 360, to surfaces 341 and 361 (not shown).

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. A roof mirror assembly, comprising:
   first and second mirror panels having first and second reflective surfaces and first and second back portions respectively, said first and second mirror panels being joined together so that said first and second reflective surfaces are substantially perpendicular to each other; and
   first and second mounting blocks for mounting said panels onto another structure, each of said first and second mounting blocks being attached to both said first and second back portions of said mirror panels, wherein said back portions extend along said respective mirror panels in orientations that do not meet or intersect with said reflective surfaces, and wherein said first and second mounting block are attached to said first and second back portions by adhesive material.

2. A roof mirror assembly as recited in claim 1, said first and second mounting blocks each having first and second mounting surfaces, each of said first mounting surfaces being attached to said first back portion of said first mirror panel and each of said second mounting surfaces being attached to said second back portion of said second mirror panel.

3. A roof mirror assembly as recited in claim 1 further comprising a back plate member attached below said first and second mounting blocks.

4. A roof mirror assembly, comprising:
   first and second mirror panels having first and second reflective surfaces and first and second back portions, respectively, said first and second mirror panels being joined together so that said first and second reflective surfaces are substantially perpendicular to each other; and
   at least one mounting block for mounting said panels onto another structure, said at least one mounting block attached to both said first and second back portions of said mirror panels, wherein said back portions extend along said respective mirror panels in orientations that do not meet or intersect with said reflective surfaces, said at least one mounting block being first and second mounting blocks, said first and second mounting blocks each having first and second mounting surfaces, each of said first mounting surfaces being attached to said first back portion of said first mirror panel and each of said second mounting surfaces being attached to said second back portion of said second mirror panel, each of said mirror panels further having a protruding element extending from said back portion thereof in a direction generally away from said reflective surface of said mirror panel, said protruding element forming first and second receiving surfaces extending along portions thereof for attachment thereto of said first and second mounting surfaces of said first and second mounting blocks.

5. A roof mirror assembly as recited in claim 4, wherein each of said first and second receiving surfaces of each of said protruding elements lies in a plane oriented substantially perpendicularly to planes lying along each of said reflective surfaces.

6. A roof mirror assembly as recited in claim 4, wherein each of said first receiving surfaces of each of said protruding elements lies in a plane oriented substantially perpendicular to planes lying along each of said reflective surfaces and wherein each of said second receiving surfaces of each of said protruding elements lies in a plane oriented substantially parallel to said planes of said reflective surfaces.

7. A roof minor assembly as recited in claim 4, wherein each of said first and second receiving surfaces of each of said protruding elements lies in a plane oriented substantially parallel to planes lying along each of said reflective surfaces.

8. A roof mirror assembly as recited in claim 4, said first mirror panel further having a first edge surface lying in a plane substantially oriented at a 45° angle to a plane of said first reflective surface and said second minor panel further having a second edge surface lying in a plane substantially oriented at a 45° angle to a plane of said second reflective surface, wherein said first and second edge surfaces are joined together creating a common plane substantially oriented at a 45° angle to both of said planes of said reflective surfaces, and further wherein said joining together of said panels along said common plane causes said first and second reflective surfaces of said mirror panels to be oriented substantially perpendicular to each other.

9. A roof mirror assembly as recited in claim 8, wherein said first and second edge surfaces are joined together creating a miter joint.

* * * * *